United States Patent [19]
Astle

[11] Patent Number: 5,608,652
[45] Date of Patent: Mar. 4, 1997

[54] REDUCING BLOCKING EFFECTS IN BLOCK TRANSFER ENCODERS

[75] Inventor: Brian Astle, Plainsboro, N.J.

[73] Assignee: Intel Corporation, Santa Clara, Calif.

[21] Appl. No.: 439,757

[22] Filed: May 12, 1995

[51] Int. Cl.⁶ ........................... G06F 17/00
[52] U.S. Cl. ........................... 364/514 R
[58] Field of Search ............ 364/514 A, 514 R, 364/715.02; 348/239, 578, 396, 398; 352/48, 85

[56] References Cited

U.S. PATENT DOCUMENTS 5,426,673  6/1995  Mitra et al. ............... 348/398
5,506,621  4/1996  Ogasawara et al. ......... 348/396

Primary Examiner—Ellis B. Ramirez
Attorney, Agent, or Firm—William H. Murray; N. Stephan Kinsella

[57] ABSTRACT

A computer-implemented method and apparatus for encoding video signals, wherein the encoding is defined by a plurality of encoding parameters. According to a preferred embodiment, an initial quantization level is determined for quantizing a block of signals representative of a block of pixels of a picture, wherein the initial quantization level is an encoding parameter of the plurality of encoding parameters. At least one encoding parameter of the plurality of encoding parameters is modified before encoding the block of signals to provide a modified plurality of encoding parameters such that block edge artifacts between the block of pixels and at least one adjacent block of pixels that arise after decoding encoded signals are reduced. In an alternative preferred method and apparatus for encoding a block of signals representative of a block of pixels of a picture, wherein the encoding is defined by a plurality of encoding parameters including a quantization level selected from a plurality of possible quantization levels, an encoding error is determined for the block of pixels such that the encoding error for the block of pixels tends to be larger for encoding parameters that cause a block edge artifact between the block of pixels and at least one adjacent block of pixels. A plurality of encoding parameters is selected in accordance with the encoding error.

34 Claims, 6 Drawing Sheets

FIGURE 1. ENCODING SYSTEM

FIGURE 2. DECODING SYSTEM

REDUCING BLOCKING EFFECTS IN BLOCK TRANSFER ENCODERS

BACKGROUND OF THE INVENTION

1. Field of the Invention

The present invention relates to signal processing, and, in particular, to computer-implemented processes and apparatuses for encoding and decoding video signals.

2. Description of the Related Art

This invention relates to signal processing which is often used to compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections.

Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants. In such a video conferencing system, each PC system also preferably receives and decompresses compressed signals from the PC systems of the remote participants to play the decompressed video signals locally. The encoder may also, in some usages, encode video pictures offline to perform more computation-intensive and more efficient encoding.

Such encoding operations that compress video image signals typically operate on subsets of the image, such as (8×8) blocks of pixels, or on macroblocks comprising a number of such blocks. A macroblock comprises a (16×16) array of luminance pixels (also known as "luma pels") and two associated (8×8) blocks of chroma information. The (16×16) luma array is further divided into four (8×8) blocks, and all six blocks in a macroblock are typically transformed using the forward discrete cosine transform (DCT), quantized, and further encoded.

Thus, the (8×8) blocks of the image to be encoded are typically transformed by a forward DCT to generate a transformed signal comprising 64 DCT coefficients, which are also arranged in an (8×8) block. One technique for controlling the bit rate of the encoded bitstream is to select varying quantization levels at the encoding stage which are applied to the DCT coefficients to produce coefficient indexes. Varying quantization levels may be produced by using a basic quantization table which is multiplied by the quantization level (also referred to as the quantizer step size or quantization scale). Thus, when a basic quantization table is utilized in this manner, the quantization scale corresponds to the quantization level. For example, a quantization scale of 7 corresponds to a quantization level of 7, where 7 is multiplied by each entry in the basic quantization table to produce a scaled quantization table that corresponds to quantization level 7. A particular quantization level is typically selected within an acceptable range of quantization levels which are expected to produce approximately the desired codesize.

In quantization, each DCT coefficient is divided by the quantization factor in the corresponding (8×8) block position in order to reduce the number of bits needed to represent the coefficient. As is appreciated by those skilled in the art, use of a coarser quantization table, associated with a coarser quantization level, implies using fewer bits to encode an image but at the cost of image quality. Use of finer quantization tables results in encoded bitstreams with more bits but with higher quality images upon decompression or decoding. This type of bit rate control is often referred to as primary bit rate control. Secondary bit rate control involves the dropping of pictures or images from the video stream. The secondary bit rate control is a back-up mode in case the primary bit rate control is insufficient.

Existing techniques for encoding video signals include the H.261 (P×64) video compression method developed by the International Telegraph Union (ITU), and standards developed by the Moving Pictures Experts Group (MPEG) of the International Standards Organization (ISO), such as the ISO/IEC 11172 (MPEG-1) and ISO/IEC 13818 (MPEG-2) standards.

In existing techniques for encoding video signals, a reconstructed picture decoded from the encoded bitstream can suffer quality degradation due to, inter alia, inaccuracies caused by the quantization and dequantization process. In particular, encoding pictures on a block-by-block basis in which quantization is applied may lead to artifacts in the decoded images in the form of edges between the blocks. Such block edge artifacts are also referred to as blocking effects or blockiness.

Postfiltering is one technique which may be employed to smooth out those edges. Conventional methods of postfiltering use linear filters applied indiscriminately over the image or just along block boundaries. However, such techniques attempt to reduce artifacts which are effectively built into encoded video signals, rather than reducing block edge artifacts before pictures are encoded. Such post-filtering methods also tend to reduce real edges that happen to correspond to block boundaries.

There is thus a need for methods and apparatuses for encoding video signals to reduce blocking effects during the encoding process itself.

SUMMARY

There is provided herein a computer-implemented method and apparatus for encoding video signals, wherein the encoding is defined by a plurality of encoding parameters. According to a preferred embodiment of the invention, an initial quantization level is determined for quantizing a block of signals representative of a block of pixels of a picture, wherein the initial quantization level is an encoding parameter of the plurality of encoding parameters. At least one encoding parameter of the plurality of encoding parameters is modified before encoding the block of signals to provide a modified plurality of encoding parameters such that block edge artifacts between the block of pixels and at least one adjacent block of pixels that arise after decoding encoded signals are reduced. In an alternative preferred method and apparatus for encoding a block of signals representative of a block of pixels of a picture, wherein the encoding is defined by a plurality of encoding parameters including a quantization level selected from a plurality of possible quantization levels, an encoding error is determined for the block of pixels such that the encoding error for the block of pixels tends to be larger for encoding parameters that cause a block edge artifact between the block of pixels and at least one adjacent block of pixels. A plurality of encoding parameters is selected in accordance with the encoding error.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a method and apparatus for encoding blocks of a picture to reduce block edge artifacts between adjacent blocks of the decoded picture. After selecting an initial quantization level for the current block to be encoded, the DCT coefficient indexes and/or the quantization level are modified if possible to reduce potential block edge artifacts by reducing the discontinuities in pixel values that can occur across block boundaries. In effect, errors such as discontinuities at the boundaries of the block are reduced by injecting more error across the whole block. However, because block edge artifacts caused by discontinuity errors are relatively more perceptible than errors spread across the block, overall picture quality of the decoded picture is improved. The present invention is described in further detail hereinbelow.

Video Processing System Hardware

Figure 1:
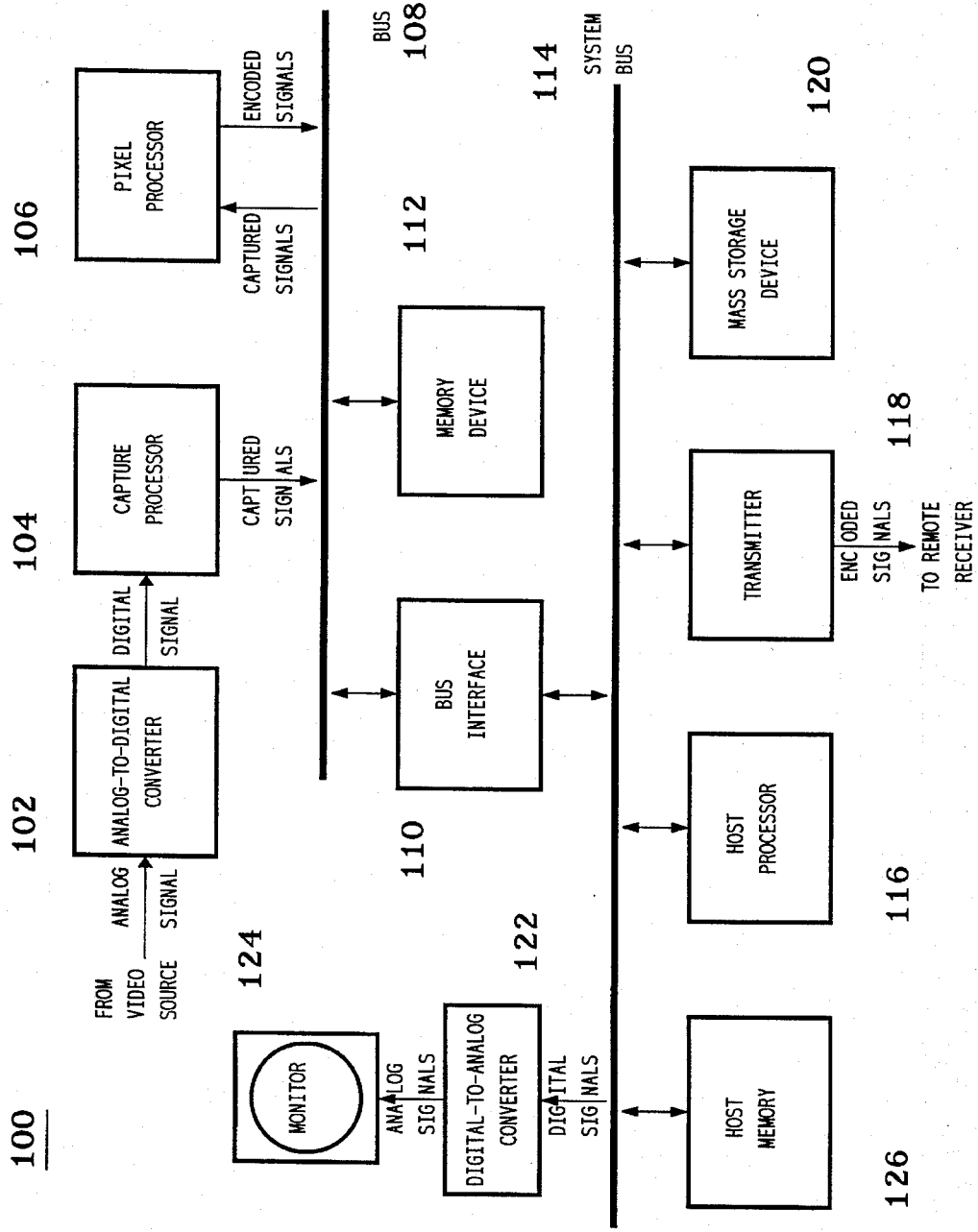
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
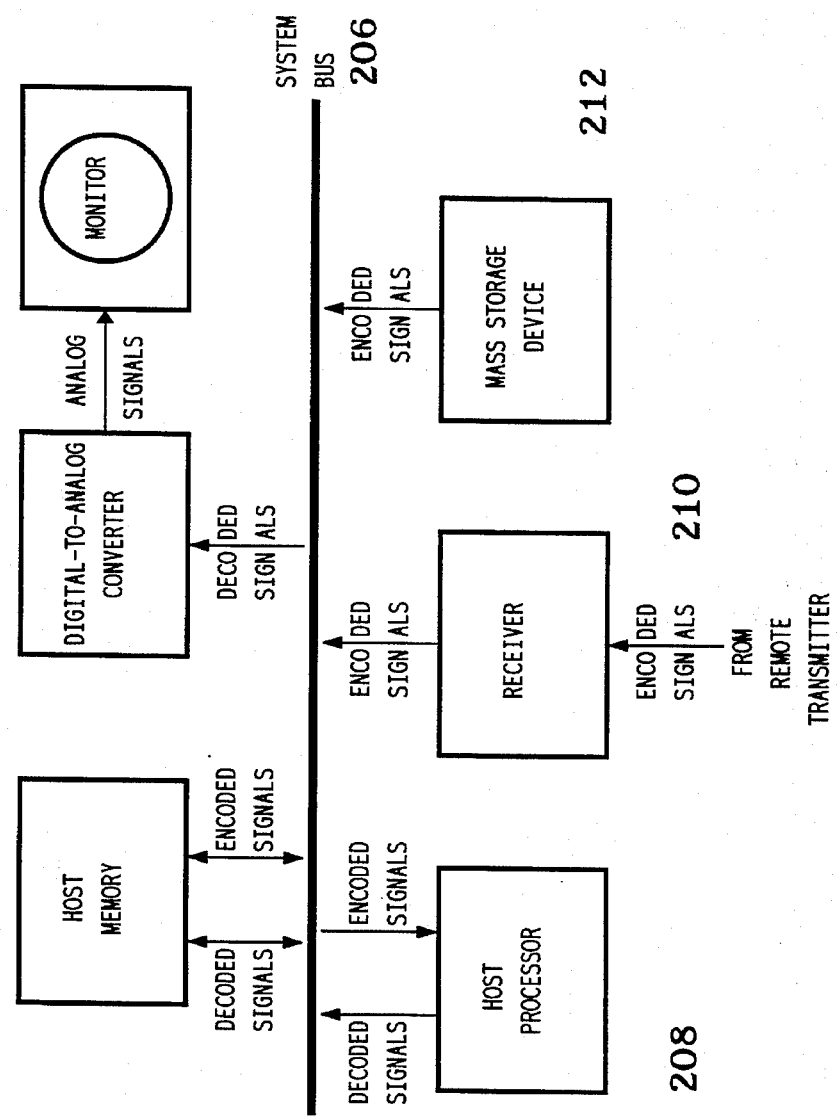
FIG. 2 is a computer-based decoding system for decoding the video signals encoded by the encoding system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus, Extended ISA (EISA) bus, or Peripheral Component Interface (PCI) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 sets the quantization level for particular blocks to be encoded as described in further detail hereinbelow.

Encoder Rate Control

As will be understood, one reason for block edge artifacts is that encoding techniques such as DCT and quantization are performed on local regions of a picture, such as (8×8) blocks. While the quantization level is selected to achieve a desired codesize and also to minimize the overall coding error within the block, each block is treated independently in minimizing error. Thus, the effect of blockiness caused at boundaries between blocks may occur because it is not taken into account when minimizing error within the block. However, such artifacts are more noticeable than errors that would be produced by having a slightly higher overall error distributed throughout the block. Thus, in the present invention the ideal or initial quantization level or other encoding parameters that would tend to minimize overall error are adjusted to reduce block edge artifacts at the expense of increasing overall error. Because the block edge artifacts are more noticeable, this results in a visual improvement in decoded pictures even if overall error is increased.

Figure 3:
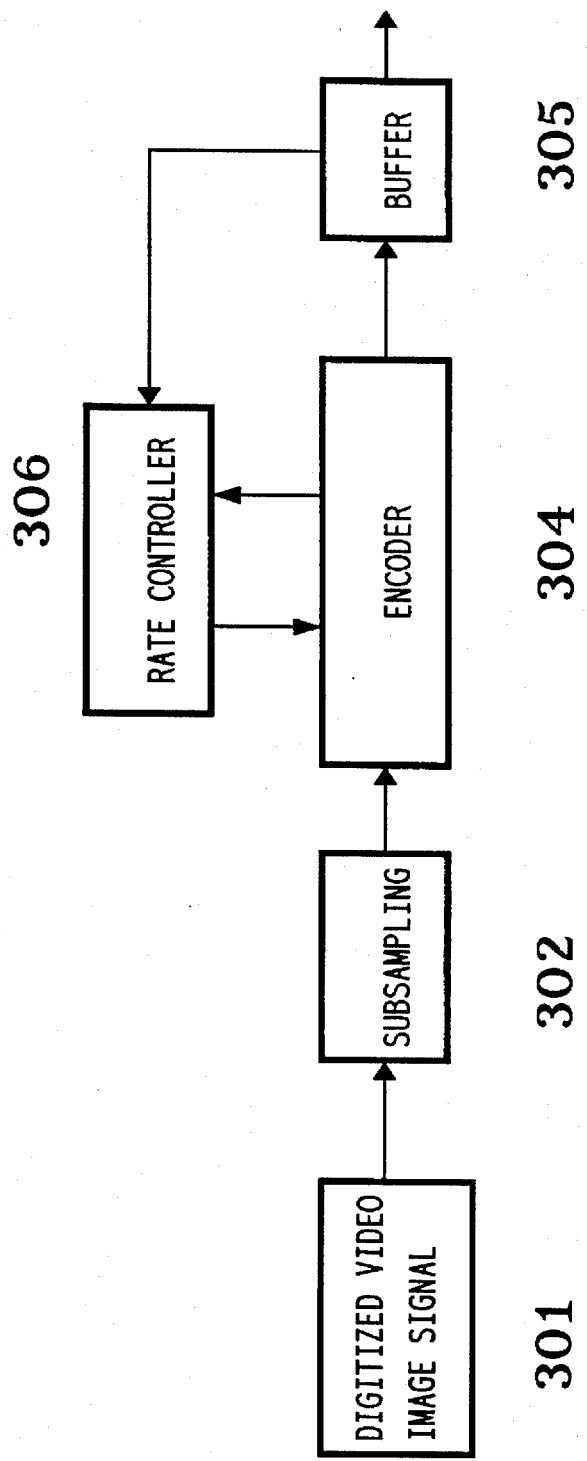
FIG. 3 is a process flow diagram of the encoding processing implemented by the encoding system of FIG. 1, in accordance with the present invention.

Referring now to FIG. 3, there is shown a process flow diagram of the encoding processing implemented by capture processor 104 and pixel processor 106 of FIG. 1, according to a preferred embodiment of the present invention. As shown in FIG. 3, capture processor 104 of FIG. 1 captures and digitizes video image signals to provide a digitized video image signal 301. As described above, video image signal 301 is a single picture of video data, which may be a still image or one of a plurality of pictures that constitute motion video. Capture processor 104 further performs the subsampling 302 of digitized image 301 to provide a subsampled, digitized video image comprising an array of pixels. At this point the pixel array is broken up into subimages or blocks of (8×8) pixels which are independently encoded further.

Encoder 304, also under control of rate controller 306, applies a transform such as a DCT to the subimage blocks and quantizes the DCT coefficients at a determined quantization level, as described in further detail below. Buffer 305 next receives the encoded bitstream representing the quantized DCT coefficients for transmission via the transmission medium to a destination source. It will be understood by those skilled in the art that, in a preferred embodiment, the functional elements of the process flow diagram of FIG. 3 are implemented by capture processor 104 and pixel processor 106 of FIG. 1. Those skilled in the art will further appreciate that additional processing may be applied to video image signal 301 at or after the encoder 304 stage, such as motion estimation, inter- or intra-picture encoding, and run-length encoding.

Rate controller 306 adjusts the bit rate by varying the quantization levels to be applied to the DCT coefficients of the transformed video image in the following-described manner. If a first encoded picture yields an encoded bitstream having more bits than the target bitstream size for that picture, a coarser (i.e., generally higher) quantization level may be applied to the next picture in order to reduce the bit rate so that the average bit rate approaches the target bitstream rate. Thus, as will be understood by those skilled in the art, a finer or coarser quantization level may be used to increase or decrease the target bitstream rate.

A given quantization level Q corresponds to one of several quantization tables having generally coarser or finer quantization factors. A particular quantization table is achieved, in a preferred embodiment, by scaling a basic quantization table by a quantization scale equal to the quantization level Q, where Q may range from 1 to 31. Thus, each entry in the basic table is multiplied by the quantization level Q to form a quantization table corresponding to the desired quantization level. The new quantization table thus formed is used to quantize the DCT coefficients produced from DCT transforms applied to a given video image. The MPEG-1 encoding standard utilizes the quantization matrix as shown in Table 1, below, which may be used as the basic quantization table for the present invention:

TABLE 1

MPEG-1 Basic Quantization Table

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

In quantization, each DCT coefficient of the coefficients of a transformed (8×8) block is divided by the quantization factor in the corresponding (8×8) block position of the applicable quantization table, and then either rounded to the nearest number or the fractional part is truncated. When DCT coefficients are scaled down in this manner by dividing by a quantization factor, many of them become zeros, making them easier to represent with fewer bits, for example by run-length encoding applied to the bitstream after the encoder stage 304.

One goal of such a bit rate control may be to minimize the total mean square error over the entire picture. Such a strategy may be appropriate for encoding video sequences comprising scene changes and where motion may occur in any region of the picture. In video conferencing usage, however, scene changes may be rare or even nonexistent and motion tends to be concentrated in particular regions of the images (e.g., the center of the picture containing conference participants), while other regions containing background scenes may change infrequently, if at all. Moreover, the human eye is more sensitive to coding errors in different types of video scenes. For example, the human eye is more sensitive to coding errors in smooth or uniform regions (e.g., plain walls) than in regions of high random detail (e.g., foliage). Similarly, the human eye is more sensitive to coding errors in regions of stationary uniform detail (e.g., striped wallpaper) than in regions of motion (e.g., person moving across a room). As such, overall video quality is improved by using finer quantization to encode those regions to which the human eye is more coding-error sensitive (thereby preserving more detail) than is used for those regions to which the human eye is less coding-error sensitive. In this manner, scarce transmission or storage bandwidth is shifted from less crucial to more crucial needs so that overall quality is improved.

Those skilled in the art will understand that error is often determined utilizing a calculation such as the L1 or L2 Norm. The L1 Norm has the following form:

$$L1 \text{ Norm} = \sum_{i=0}^{i=n} \sum_{j=0}^{j=m} |a_{ij} - b_{ij}|$$

where:

$a_{ij}$ is the value in the ith row and jth column of an original block;

$b_{ij}$ is the value in the ith row and jth column of an encoded and decoded block representative of the original block;

n is the number of rows in a block; and m is the number of columns in a block.

The L2 Norm has the following form:

$$L2 \text{ Norm} = \sum_{i=0}^{i=n} \sum_{j=0}^{j=m} (a_{ij} - b_{ij})^2$$

As will be understood by those skilled in the art, some coding standards (such as MPEG-1) allow the quantization level to be varied throughout the picture in order to match the local visual complexity and achieve the best perceived quality of the coded picture. Within a picture the quantization level should be set higher in areas where there is more high-frequency energy, i.e. in areas of greater visual complexity, partly because quantization artifacts are less visible in such areas. Thus, in general the quantization level should be lower in flat or smooth areas (i.e. areas with low complexity or spatial energy), such as the sky, to reduce the block edge artifact. Saving bits in complex or busy areas of a picture allows the encoder to reduce the quantization level in smooth areas of the picture and hence to reduce artifacts such as blockiness. However, even with such techniques, block edge artifacts can still exist in the decoded picture, as described in further detail below.

Each block may be quantized using different quantization levels. Typically, however, each (8×8) block within a macroblock is quantized at the same quantization level. Thus, quantization levels are usually chosen on a macroblock level, and this quantization level is applied to each block within the macroblock.

The selection of which quantization level will be used is part of the bit rate control in the compression processing of the present invention. Rate controller 306 thus selects the initial quantization level at which to encode blocks within a macroblock based on some or all of the following factors: a characterization of the complexity of the picture (e.g., based on the sum of the absolute values of the DCT coefficients), the error variance, the actual fullness of rate control buffer 305 and the desired nominal fullness, image or block size, the current position within the picture, the results of prescan, the channel bit rate, picture rate, the experience of coding similar pictures earlier in the sequence, and the buffering capability of a decoding system such as decoding system 200.

In a preferred embodiment, therefore, as described above, the video image signals, which comprise pictures in a video conferencing environment, are divided into regions of one or more (8×8) blocks, where each region may be encoded using a different quantization level. Rate controller 306 keeps track of the total number of bits used to encode each region of a picture, and of the total number of bits used to encode each picture.

The initial quantization level Q for the current region of the current picture may in some uses be selected using Equation (1) as follows:

$$Q = Q_{ave} * \frac{(C_{ave} + R*C)}{(R*C_{ave} + C)} \quad (1)$$

where C is the complexity of the current region, $C_{ave}$ is the average complexity for the current picture, $Q_{ave}$ is the average quantization level for the current picture, and R is a specified constant (preferably with a value of approximately 2). Such a formula allows the quantization levels to vary from block to block over each picture, where the constant R determines the magnitude of the allowable variation.

As will be understood, when a DCT is performed on an (8×8) block of an image, the 64 coefficients are arranged in zig-zag fashion from the upper left corner of an (8×8) block down to the lower right corner. When arranged this way, the upper left corner of a block of DCT coefficients contain the DC component and lower frequency coefficients of the transformed block, while the lower right corner contains the higher frequency components of the transformed block. Larger quantization factors are grouped in the lower right regions of the each quantization table corresponding to a quantization level, as can be seen in the Table 1, above, while smaller divisors are grouped in the upper left region of the a table. In this manner higher frequency coefficients tend to be divided by larger divisors than the DC component and lower frequency components. The reason for this weighting is that loss of information in the higher frequency ranges is less visible to human visual perception than is loss of information in the lower frequency ranges.

In the present invention rate controller 306 determines an initial quantization level according to any suitable technique, such as in the manner hereinabove described. Thereafter, the initial quantization level so selected and/or the DCT coefficient indexes are adjusted to reduce block edge artifacts between adjacent blocks, as described in further detail below. It will be understood that, for a selected quantization level (corresponding to the basic quantization table scaled by the quantization level), each DCT coefficient is divided by the corresponding quantization factor in the table, to yield a DCT coefficient index. It is this DCT coefficient index that is encoded rather than the full DCT coefficient itself, thereby yielding bandwidth savings. Upon decoding, decoding system 200 multiplies the decoded DCT coefficient index by the corresponding quantization factor to produce an approximation of the original DCT coefficient.

Block Edge Artifacts

Figure 4:
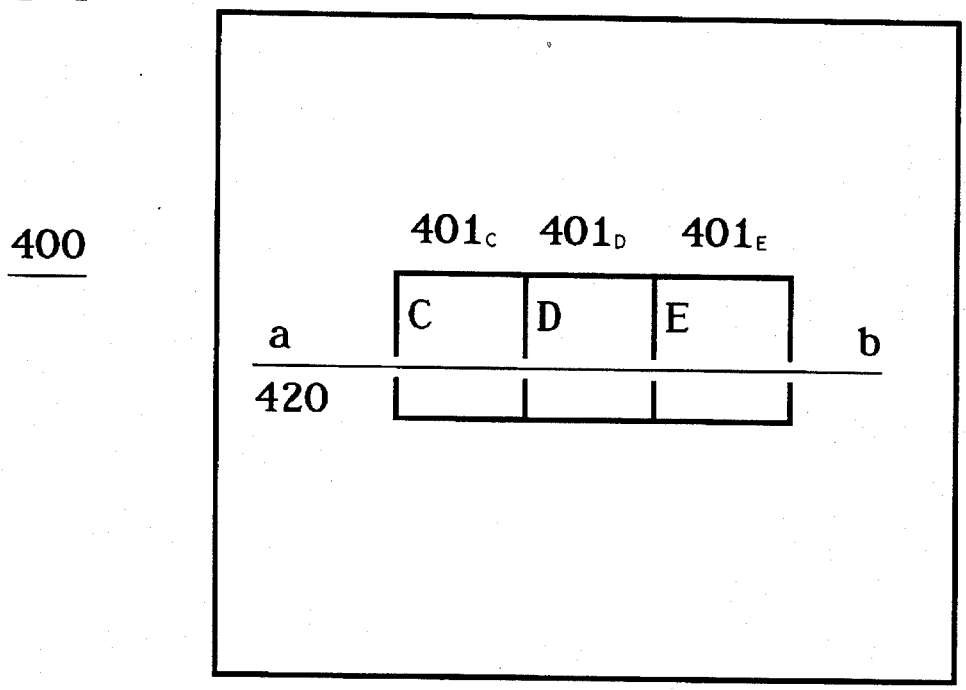
FIG. 4 is an illustration of adjacent blocks within a picture which is processed by the encoding system of FIG. 1.

Referring now to FIG. 4, there is shown an illustration of adjacent blocks $401_C$, $401_D$, and $401_E$ within a picture 400 which is processed by encoding system 100 of FIG. 1. As illustrated, block $401_C$ is horizontally adjacent to block $401_D$, and block $401_D$ is horizontally adjacent to block $401_E$. It will be appreciated that these three blocks may or may not be part of the same macroblock. Scan line 420 represents a horizontal scan line of pixel values from point a to point b. It will be understood that picture 400 comprises a plurality of blocks 401, of which blocks $401_C$, $401_D$, and $401_E$ are only a subset, and that each block 401 is encoded by encoding system 100. It will further be understood that, upon decoding and display by decoding system 200, the block edge artifacts described hereinabove may be visible along the boundaries between adjacent blocks 401.

Figure 5:
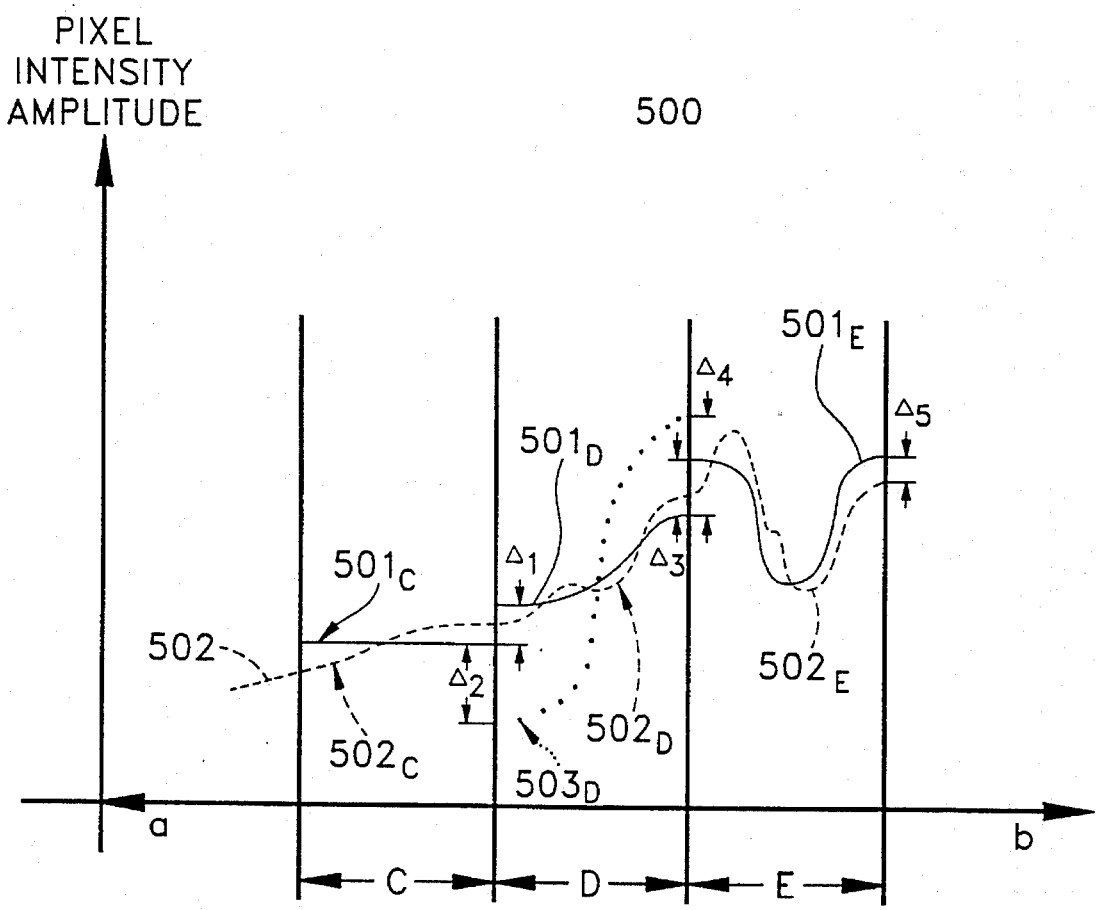
FIG. 5 is a graph plotting pixel amplitude versus distance for a scan line across the blocks of FIG. 4.

Referring now to FIG. 5, there is a shown a graph 500 plotting pixel intensity amplitude versus distance for scan line 420 across blocks $401_C$, $401_D$, and $401_E$ of FIG. 4. Dashed true amplitude line 502 represents the actual amplitude of the value of pixels lying within scan line 420, and, as illustrated, is relatively smooth and continuous. As will be understood, in other scan lines, discontinuities can represent an actual or real edge within the picture, rather than an artifact. As illustrated, true amplitude line 502 comprises segments $502_C$, $502_D$, and $502_E$, corresponding respectively to the portions of true amplitude line 502 lying within blocks $401_C$, $401_D$, and $401_E$.

Those skilled in the art will realize that if true amplitude line 502 was encoded and decoded with perfect accuracy then no block edge artifacts would arise. However, discontinuities in the encoded and/or decoded version of such curves at the boundaries between blocks causes such block edge artifacts, unless the discontinuity is present at a block edge in the original image. The reason for such artifacts will now be discussed with reference to FIG. 5. DCT amplitude lines $501_C$, $501_D$, and $501_E$, which correspond respectively to blocks $401_C$, $401_D$, and $401_E$, are represented as solid line segments in graph 500. As illustrated in FIG. 5, each DCT amplitude line $501_i$ only approximates true amplitude line $502_i$, where i is a variable representing a given block 401, and is the DCT representation of true amplitude line $502_i$ before the DCT coefficients are quantized. Thus, it can be seen that inaccuracies in representing original values arise even before quantization when not enough bits can be afforded to accurately represent all the higher-frequency DCT coefficients, which are necessary to accurately represent curves having any higher-frequency characteristics. Thus, as illustrated in FIG. 5, true amplitude line $502_C$ is approximated by DCT amplitude line $501_C$, which contains only a DC component, because the first order DCT coefficient is so relatively small that it is reduced to zero. Because DCT amplitude line $501_C$ has only a DC component and no higher-order components, it cannot curve at all and thus cannot exactly match the contours of true amplitude line $502_C$, which has a slight curve.

Similarly, true amplitude line $502_D$ is approximated by DCT amplitude line $501_D$, which contains only a DC component and the first order (i.e. cosine) DCT term. Thus, as can be seen in FIG. 5, many of the higher-frequency wiggles in true amplitude line $502_D$ are not represented in DCT amplitude line $501_D$. There will be some quantifiable amount of error associated with inaccuracies in representing a true amplitude line 502 with a DCT amplitude line 501, for a desired bit rate for a block or picture. The scarce bits which are used to represent various DCT coefficients will be allocated with at least one goal being to minimize the total error over the entire picture, such as the L1 or L2 Norm as previously described. This heuristic tends to minimize the visibility of such inaccuracies, at least for reconstructed pixels in the interior of a block.

However, even where overall error is reduced, inaccuracies in representing the DCT coefficients can introduce relatively more noticeable errors in the form of discontinuities along the edges of blocks 401, i.e. at the boundaries between blocks 401. For example, as shown at the boundary between blocks 401$_C$ and 401$_D$ in FIG. 5, there is an amplitude difference of $\Delta_1$ between DCT amplitude lines 501$_C$ and 501$_D$. Similarly, there is an amplitude difference of $\Delta_3$ between DCT amplitude lines 501$_D$ and 501$_E$. However, such inaccuracies and discontinuities are relatively insignificant in comparison to the possibly much larger errors that are caused when quantization of the DCT coefficients is utilized.

When quantization of the DCT coefficients is utilized, as is often the case, the potential for discontinuities at block edges becomes significant and can produce noticeable block edge artifacts. For instance, quantized amplitude line 503$_D$ represents true amplitude line 502$_D$ much less accurately than does unquantized DCT amplitude line 501$_D$. The reason for this increased discontinuity is that, in this example, the first order DCT coefficient used to represent quantized amplitude line 503$_D$ is reproduced with even more error when quantized by encoding system 100 and dequantized by decoding system 200.

For example, suppose that the first-order DCT coefficient for true amplitude line 502$_D$ is 27. If the quantization factor for first-order coefficients for block 401$_D$ is 10, then the index will be 27/10=2.7. This fractional number may be rounded up to 3, the nearest whole number, and transmitted, after further encoding, to decoding system 200. Upon dequantization, decoding system 200 multiplies the received index 3 by the quantization factor 10 for that pixel, yielding a reconstructed DCT coefficient of 30, which is larger than 27, the actual first-order DCT coefficient. This can give rise to exaggeration of the encoded/decoded true amplitude line 502$_D$, as shown in quantized amplitude line 503$_D$. As shown in FIG. 5, amplitude difference $\Delta_2$ between quantized amplitude line 503$_D$ and DCT amplitude line 501$_C$ may be significantly greater than $\Delta_1$. Thus, quantization can exacerbate the potential discontinuities at block boundaries, thus causing a very noticeable and problematic block edge artifact.

Postfiltering is one technique which may be employed to smooth out such edges. An example of a system for performing post-filtering for decoded video signals, which also discloses methods for rate control and quantization of DCT coefficients, is disclosed in U.S. patent application Ser. No. 08/329,548, filing date Oct. 26, 1994, entitled "Post-Filtering for Decoded Video Signals", the entirety of which is incorporated herein by reference. However, postfiltering can be inefficient because inaccurate information is encoded and then decoded. Another problem with postfiltering is that real edges as well as artificial block edge artifacts, tend to be reduced in the postfiltering process.

In the present invention, when a block is encoded, its quantization level and/or DCT coefficient indexes are varied, when possible, to reduce such block edge discontinuities. Because initial quantization levels are usually selected to minimize the total error, changing the quantization level for a given block (or macroblock) can increase the error associated with representing the block. Further, changing a DCT coefficient index directly introduces error into the accuracy of the DCT representation of the original block. However, the increase in overall error is distributed throughout the block, which causes relatively invisible artifact increases, while the error at the block edges is decreased, thus decreasing block edge artifacts. There is thus a trade off between overall error and error at block edges. In this manner, overall perceptible artifacts decrease and picture quality is thus improved.

Figure 6:
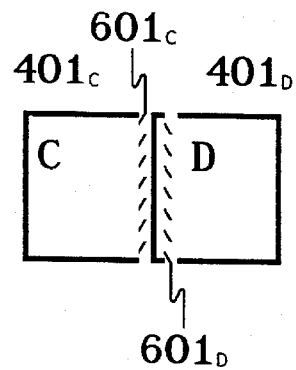
FIG. 6 is a more detailed illustration of blocks C and D of the picture of FIG. 4.

In a preferred embodiment, the block edge artifact reduction method of the present invention is implemented for a given block edge only if an edge or discontinuity is not present in the original picture which is being encoded. Referring now to FIG. 6, there is shown a more detailed illustration of blocks 401$_C$ and 401$_D$ of picture 400 of FIG. 4. Before attempting to reduce block edge artifacts at the boundary between these blocks, therefore, an average of the pixel values in the column or row nearest the boundary in one block is compared to the average of the pixel row or column of the adjacent block. This comparison can be used to determine whether an actual edge exists in the pre-encoded picture, which should be preserved in the encoding process.

For example, the pixels of pixel column 601$_C$ of block 401$_C$ are averaged to produce an average AVG(601$_C$). Similarly, the pixels of pixel column 601$_D$ are averaged to yield average value AVG(601$_D$). If the difference between these two values is more than a predetermined threshold, this indicates that a real edge or related type of discontinuity occurs in the source image exactly at the boundary between blocks 401$_C$ and 401$_D$. As will be understood, this edge should be preserved rather than corrected so that it is accurately represented in the decoded picture. Thus, the block edge artifact reduction of the present invention with respect to a boundary between adjacent blocks is omitted where $$ABS(AVG(601_C)-AVG(601_D)) \geq K_1$$

where $K_1$ is a predetermined threshold difference. Those skilled in the art will realize that other techniques may be utilized to determine whether an edge occurs in the source image, so that the real edge may be preserved rather than eliminated. Those skilled in the art will further appreciate that certain pixel row or column averages may already be computed when the DCT coefficients are determined. Thus, for example, AVG(601$_C$) may have already been computed and may be stored in memory for use during the encoding method of the present invention rather than being computed a second time.

Where the source image does not contain an actual edge, the present invention attempts to reduce any block edge artifacts before encoding the current block, in the manner described as follows with reference to the encoding of block 401$_D$. Referring again to FIG. 5, when rate controller 306 is to encode pixels of block 401$_D$, it is assumed that, proceeding from left to right, block 401$_C$ has already been encoded at a given quantization level. The block above block 401$_D$ may already have been encoded, in which case the top edge row of pixels of block 401$_D$ may also be taken into account to reduce block edge artifacts occurring at both the left and top edges of block 401$_D$. For purposes of explanation, however, the method of the present invention will be discussed only with respect reducing block edge artifacts along a single edge.

First, an initial quantization level is selected for block $401_D$ in accordance with standard techniques. As is understood, such standard techniques may select an initial quantization level that tends to minimize overall error, but a discontinuity may still exist at the block edge. Thus, it is next determined whether there is a discontinuity at the boundary between blocks $401_C$ and $401_D$ above a certain threshold. As will be understood, this threshold may be selected empirically such that it corresponds to noticeable block edge artifacts. For example, assuming that true amplitude line $502_C$ will be encoded to yield line $501_C$, line $501_C$ is used as a reference to compare quantized amplitude line $503_D$ to. As will be understood, in this example quantized line $503_C$ is not separately labeled in FIG. 5 because DCT amplitude line $501_C$ is the same as quantized amplitude line $503_C$.

Continuing with the present example, quantized amplitude line $503_D$ using the initial quantization level will produce a discontinuity of $\Delta_2$, as shown in FIG. 5. If $\Delta_2$ is $<K_2$, a predetermined discontinuity threshold, then no changes are made before encoding block $401_D$, because the discontinuity will either be invisible or not visible enough to justify engaging in the corrective method of the present invention. As will be understood, because block edge artifacts are visible and exist along an edge comprising a plurality (e.g., 8) of pixel rows or columns, $\Delta_2$ represents the average discontinuities of each pixel row of a vertical block edge (or of each pixel column of a horizontal block edge).

However, assuming the difference is larger than the predetermined discontinuity threshold $K_2$, the present invention attempts to adjust the quantization level and/or the DCT coefficient indexes to reduce the discontinuity. For implementations in which all blocks within a macroblock are encoded at the same quantization level, blocks lying within the same macroblock must use the same quantization level. In this case the quantization level for the second block cannot be varied. However, if block $401_C$ is part of one macroblock and block $401_D$ is part of a second macroblock, or if a system is used in which each block's quantization level may be varied independently, then the quantization level used for block $401_D$ may be adjusted in an attempt to reduce $\Delta_2$ to below another predetermined threshold $K_3$. For example, if an initial quantization level Q is selected in accordance with standard quantization techniques, then quantization levels of Q+1, Q+2, . . . may be applied to the block to see if one of the modified quantization levels yields a lower block edge discontinuity than Q, while not intolerably increasing overall error.

In conjunction with or as an alternative to varying the quantization level itself, various indexes of the quantized DCT coefficients of the block may be directly varied in an attempt to reduce $\Delta_2$ below some predetermined threshold, such as $K_3$. In a preferred embodiment of the present invention, the first-order DCT coefficient index may be adjusted up or down in predetermined increments within a predetermined range in an attempt to decrease the discontinuity at the block edge. It will be appreciated that any DCT coefficient indexes may be adjusted, but that lower-order DCT coefficient indexes will tend to have more direct effect. In a preferred embodiment, the first- and second-order DCT coefficient indexes may be varied to attempt to reduce the discontinuity. In alternative embodiments, the DC DCT coefficient index may also be varied in an attempt to reduce block edge artifacts. Thus, various combinations of variances of the DCT coefficient indexes may be applied to the block, as described above, in an attempt to reduce the block edge discontinuity. For example, the DC DCT coefficient index, and first- and second-order DCT coefficient indexes may all be varied within a predetermined range of the initial value, where the combination is selected that most reduces the overall block edge continuity and that also does not increase overall block error above tolerable limits.

In a further alternative preferred embodiment of the present invention, individual entries in the quantization table are varied in an attempt to reduce block edge artifacts. For example, if Q=5 is selected as the initial quantization level, then rather than changing the quantization level to 4 or 6, individual entries within the basic quantization table, before being scaled by the quantization level, may be changed and transmitted along with the encoded block to instruct decoding system 200 how to modify the relevant quantization table to appropriately dequantize the quantized block.

In a preferred embodiment, therefore, as the quantization level and/or coefficient indexes are varied, thereby reducing the discontinuity $\Delta_2$, the corresponding increase in error for the block as a whole is also monitored, to ensure that overall error does not rise above a threshold value $K_4$. As will be understood, threshold $K_4$ will be empirically determined such that, if overall error rises above $K_4$, then the noticeability of artifacts due to the increased error is considered to be subjectively worse than the block edge artifact that is being reduced. Thus, in a preferred embodiment, a new quantization level and/or changed DCT coefficient indexes are utilized only if the block edge discontinuity is reduced to a value lower than threshold $K_3$, and the overall block encoding error does not increase more than threshold $K_4$.

In a preferred embodiment, the method of the present invention is applied in two dimensions. For purposes of illustration, however, the method of the present invention is discussed herein with regard to application horizontally, i.e. to reduce block edge discontinuities along vertical block edge boundaries. Because changes in DCT coefficient indexes and quantization levels affect an entire block, however, the method of the present invention determines such changes to minimize the overall discontinuities for each scan line along the block edge or block edges being considered. For a block comprising (8×8) pixels, the block contains 8 rows, each of which lies within a scan line. Thus, the method described above with respect to one scan line is applied to each scan line in a block, and an optimal adjustment to quantization level and DCT coefficient indexes is selected such that the overall reduction in discontinuity along the block edge is maximized. As will be understood, when reducing block edge artifacts among two or more edges, this method is extended to reduce the overall block edge artifacts along all such edges.

Figure 7:
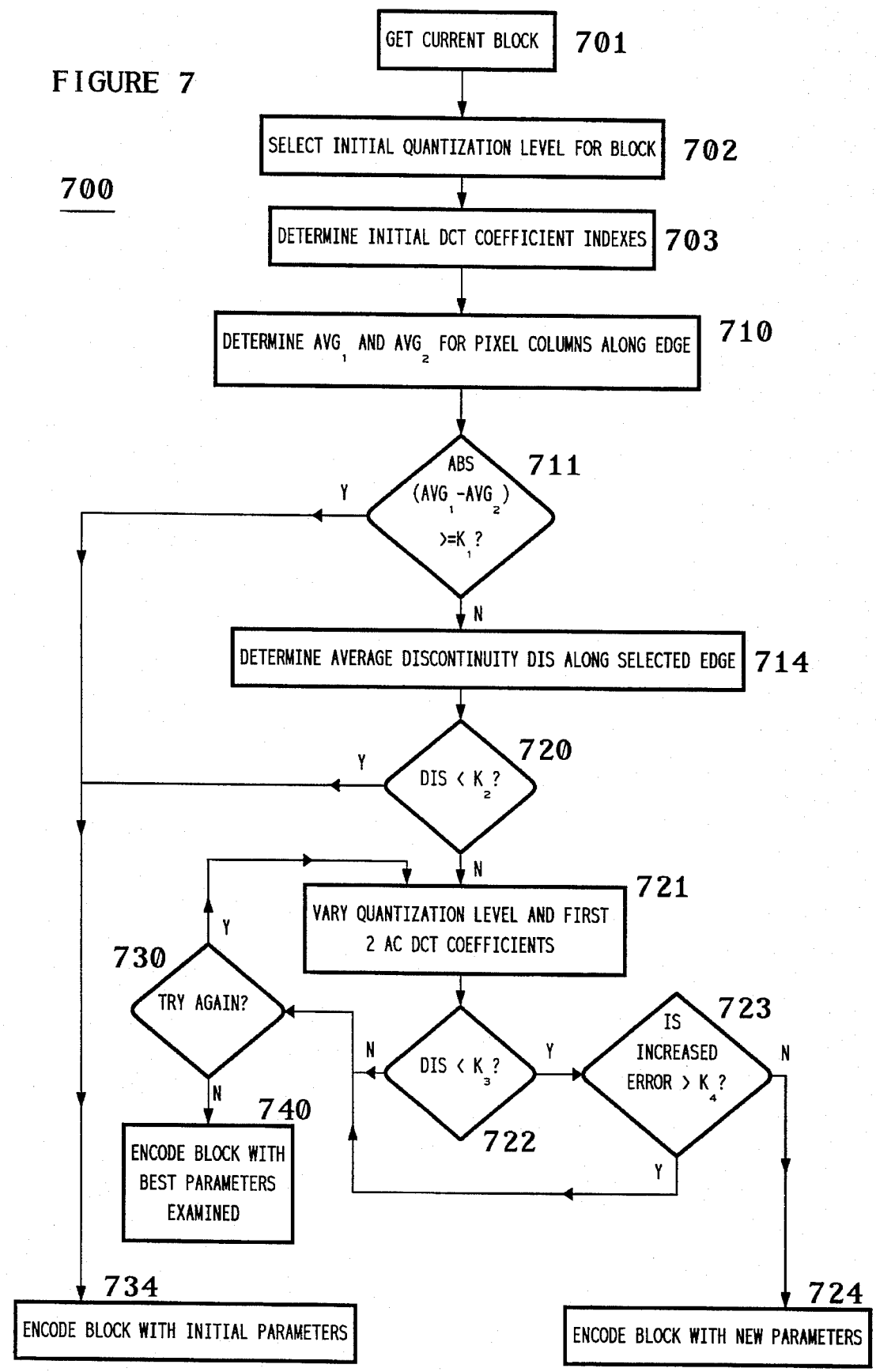
FIG. 7 is a flow chart of the method of operation of the encoding system of FIG. 1.

The method of operation of encoding system 100 of FIG. 1 with respect to reducing a single edge of the block will now be described with reference to flow chart 700 of FIG. 7. Encoding system 100 first receives the current block to be encoded (step 701 of FIG. 7). As will be appreciated, the current block is one of a plurality of blocks constituting a picture. Rate controller 306 of FIG. 3, which is implemented by capture processor 106 of FIG. 1, then determines an initial quantization level and corresponding initial DCT coefficient indexes for the current block (steps 702 and 703). As will be understood, the initial DCT coefficient indexes are determined by scaling the basic quantization table by the quantization level, and applying this scaled quantization table to the block, i.e. quantizing the block by the individual factors of the scaled quantization table. As will be understood by those skilled in the art, quantization may also be performed at a given quantization level by first applying the basic quantization table to the block and then applying the quantization level or scale to this result.

In a preferred embodiment, assuming that the neighbor blocks to the left and above the current block have already been encoded, block edge artifacts along the two edges at the left and top of the current block are reduced in accordance with the method of the present invention. In further embodiments, all four edges may be selected for edge artifact reduction, for example where multiple passes are utilized as explained above. For purposes of explanation, however, the method of FIG. 7 describes the reduction of block edge artifacts along the left edge of the current block.

To apply the method of the present invention to the left edge, pixel processor 106 determines the average value of the two columns of pixels astride, i.e. on either side of, the edge (step 710), resulting in two averages, $AVG_1$ and $AVG_2$. If $ABS(AVG1-AVG_2) \geq K_1$, then a true edge is determined to exist for the edge under consideration, and the block is thus encoded with the initially determined parameters (steps 711 and 734). Otherwise, the average discontinuity DIS along the edge is determined (step 714) by averaging the discontinuity for each pixel row (i.e. scan line) across the vertical left edge. If $DIS<K_2$, then the average discontinuity is very small and thus relatively unnoticeable, and the block is encoded and quantized utilizing the initially determined parameters (steps 720 and 734). Otherwise, the initial quantization level for the block and/or the initial first and second order DCT coefficient indexes are varied in the manner described above to reduce the average discontinuity DIS along the edge. As will be understood, various combinations variations of these parameters may be applied to determine which produces the smallest discontinuity DIS. Alternatively, as will be understood, the entries of the basic quantization table may also be varied in step 721.

If after changing one or more such parameters the new discontinuity has been reduced below a predetermined threshold $K_3$ (step 722), then pixel processor 106 checks to ensure that the overall error has not increased by more than a predetermined threshold $K_4$ (step 723). As will be understood, a calculation such as the L1 Norm may be used for this purpose. Thus, if the increased error is not greater than $K_4$, the block may be encoded with the new parameters, i.e. the new quantization level, new DCT coefficient indexes, and/or the new basic quantization table entries (step 724). As will be understood, when applied to, for example two edges of a block, one edge may have a real edge and the other edge may produce a block edge artifact. The attempt to reduce the block edge artifact may tend to diminish the real edge. Thus, as will be understood, in a preferred embodiment applicable to more than one edge, reducing a real edge may be used to trigger an increase in encoding error. Thus, a parameter change which reduces a block edge artifact at the expense of diluting a real edge will cause an increased overall error which makes the parameter change less likely to pass muster under the $K_4$ threshold test.

If, however, either the discontinuity DIS has not been reduced below $K_3$ (step 722), or if the overall encoding error has increased by more than $K_4$ (step 723), then rate controller 306 determines whether another attempt at varying the initial parameters should be made (step 730). As will be understood, rate controller 306 may try a maximum predetermined number of times to find acceptable new parameters which reduce the discontinuity, or may try a subset or all permutations of a predetermined range of variance of the initial parameters, before deciding to give up. If rate controller 306 has been unable within a predetermined number or variety of attempts to find acceptable new parameters, then the block is encoded utilizing the best parameters examined so far, including the initial parameters, i.e. those parameters that give the lowest DIS while also not increasing overall error above $K_4$ (steps 730, 740, 734, and 724). Otherwise, rate controller 306 once more varies the current quantization level, the current DCT coefficient indexes, and/or the basic quantization table entries, so as to possibly reduce the edge discontinuity DIS (steps 730 and 721). As will be understood, the current quantization level, the current DCT coefficient indexes, the basic quantization table entries, and even the current DCT coefficient signals of the current block may be considered to be parameters that define the encoding of the block, and any of these or any combination of these may be varied in an attempt to reduce block edge artifacts.

As will be understood by those skilled in the art, in alternative preferred embodiments, techniques other than the $AVG_1$ and $AVG_2$ method described hereinabove may be utilized to determine the amount of discontinuity across an edge. For example, an "energy" value may be used to determine the level of discontinuity at an edge. The energy of an edge may be characterized by the sum of the squares of the pixel differences between the eight pairs of decoded pixel values across a block boundary. The edge energy E may be represented by the following equation:

$$E = \sum_{n=1}^{8} d_n^2, \qquad (2)$$

where $d_n$ is the difference between two adjacent pixels on either side of the block boundary. Alternatively, the edge energy E may be represented by a similar summation of $d_n$, or of the absolute value $|d_n|$.

As discussed above, in a preferred embodiment, discontinuities are minimized along all edges of a current block being encoded which are adjacent to already-encoded blocks, e.g. the left and top edges, assuming a left-to-right and top-to-bottom encoding order. It will be obvious to those skilled in the art how to extend the foregoing procedures in order to minimize discontinuities along such edges.

In an alternative preferred embodiment, the method of the present invention may be applied horizontally or vertically only, i.e. only to reduce block edge discontinuities along vertical or horizontal block edge boundaries, respectively. It will be obvious to those skilled in the art how to extend the foregoing procedures in order to apply the disclosed procedures for horizontal block edge artifacts.

In preferred embodiments described hereinabove, a previous block is encoded according to the present invention, and a second, adjacent block is subsequently encoded, taking the previous block's quantization level and index changes as a given. Further, the second block's parameters may be varied as described above without considering the effect on a third block that may be encoded thereafter. In an alternate preferred embodiment, however, multiple passes may be made for a plurality of blocks, such as for all blocks within a horizontal row or column of blocks or for all blocks within a picture, to minimize both the block edge discontinuities and the increase in error caused by DCT coefficient index adjustments and quantization level adjustments.

In some video encoding standards the quantization level is the same throughout the entire macroblock. Thus, in another preferred embodiment, the method of the present invention is applied solely to minimize block edge artifacts lying along the edges of the macroblock. As will be understood, the macroblock may be considered as a block having four edges, and the quantization level and DCT coefficient indexes may be altered as described hereinabove to reduce the discontinuity errors along edges of the macroblock. In alternative embodiments wherein each block may be encoded with a different quantization level than each of its neighboring blocks, the quantization level and DCT coefficient indexes of each block may be varied to reduce block edge artifacts.

Error Determination Modification

In another preferred embodiment, block edge artifacts may be reduced during encoding by modifying the L1 or L2 Norm or other calculation which is used to determine error for purposes of bit allocation so that the error determination takes into account potential block edge artifacts. For example, the L1 Norm may be modified to provide an L1' Norm that also considers pixels of neighboring blocks which have already been encoded. Referring once more to FIG. 6, the L1' Norm, when performed on block $401_D$, where block $401_C$ has already been encoded and quantized, will determine the coding error for each pixel in column $601_C$.

As will be understood, the coding error CE for a given pixel of column $601_C$ will be equal to the difference between the original pixel's value and the decoded value of the encoded and quantized pixel value. The coding error CE will likely be caused in large part due to the quantization errors described hereinabove which give rise to block edge artifacts. CE is then subtracted in the L1' Norm from the difference $a_{ij}-b_{ij}$ for the corresponding pixel i,j in column $601_D$ which is horizontally adjacent to the pixel in column $601_C$.

Thus, when $a_{ij}-b_{ij}$ is close to CE, the error term $|(a_{ij}-b_{ij})-CE|$ in the L1' Norm will be reduced at the same time that the quantization level selected tends to reduce the block edge artifact. Thus, when a quantization level is selected that reduces the block edge artifact, the L1' Norm error determination will tend to produce a lower error measurement, making it more likely that this quantization level will be selected.

It will be appreciated that this method may be extended to cover any edge rows or columns of a block that are adjacent to already-encoded blocks. It will further be understood that such error terms $|(a_{ij}-b_{ij})-CE|$ that correspond to such edge pixels may be given a higher or lower weight by k, to produce a term $k*|(a_{ij}-b_{ij})-CE|$, to increase or decrease the tendency to select a quantization level that reduces edge discontinuity errors at the expense of an increase in overall error.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for encoding video signals, wherein the encoding is defined by a plurality of encoding parameters, the method comprising the steps of:

(a) determining an initial quantization level for quantizing a block of signals representative of a block of pixels of a picture, wherein the initial quantization level is an encoding parameter of the plurality of encoding parameters; and (b) modifying at least one encoding parameter of the plurality of encoding parameters before encoding the block of signals to provide a modified plurality of encoding parameters such that block edge artifacts between the block of pixels and at least one adjacent block of pixels that arise after decoding encoded signals are reduced.

2. The method of claim 1, wherein:

the initial quantization level corresponds to an initial quantization table having a plurality of predetermined entries;

quantizing the block of signals with a given quantization level produces a block of index signals;

signals of the block of signals, index signals of the block of index signals, and entries of the initial quantization table are encoding parameters of the plurality of encoding parameters; and step (b) comprises the step of modifying at least one of:
the initial quantization level,
a signal of the block of signals,
an index signal of the block of index signals, and
an entry of the initial quantization table.

3. The method of claim 2, wherein:

encoding the block of signals with the plurality of encoding parameters corresponds to a first encoding error and encoding the block of signals with the modified plurality of encoding parameters corresponds to a second encoding error; and step (b) comprises the step of modifying at least one of:
the initial quantization level,
a signal of the block of signals,
an index signal of the block of index signals, and
an entry of the initial quantization table
before encoding the block of signals to provide a modified plurality of encoding parameters, such that block edge artifacts between the block of pixels and at least one adjacent block of pixels that arise after decoding encoded signals are reduced and further such that any increase in error from the first encoding error to the second encoding error is below a predetermined threshold.

4. The method of claim 1, wherein:

encoding the block of signals with the plurality of encoding parameters corresponds to a first encoding error and encoding the block of signals with the modified plurality of encoding parameters corresponds to a second encoding error; and step (b) comprises the step of modifying at least one encoding parameter of the plurality of encoding parameters before encoding the block of signals to provide a modified plurality of encoding parameters, such that block edge artifacts between the block of pixels and at least one adjacent block of pixels that arise after decoding encoded signals are reduced and further such that any increase in error from the first encoding error to the second encoding error is below a predetermined threshold.

5. The method of claim 1, wherein the block of signals is a block of coefficient signals produced by transforming the block of pixels.

6. The method of claim 5, wherein the block of coefficient signals is a block of discrete cosine transform (DCT) coefficient signals produced by performing a DCT on the block of pixels.

7. The method of claim 1, wherein the initial quantization level is selected from a plurality of quantization levels.

8. The method of claim 7, wherein:

the plurality of quantization levels comprises quantization level 1 to quantization level 31; and each quantization level of the plurality of quantization levels corresponds to a quantization table produced by scaling each entry of a basic quantization table by the quantization level.

9. The method of claim 8, wherein the basic quantization table comprises the following array of predetermined entries:

| 8  | 16 | 19 | 22 | 26 | 27 | 29 | 34  |
|----|----|----|----|----|----|----|-----|
| 16 | 16 | 22 | 24 | 27 | 29 | 34 | 37  |
| 19 | 22 | 26 | 27 | 29 | 34 | 34 | 38  |
| 22 | 22 | 26 | 27 | 29 | 34 | 37 | 40  |
| 22 | 26 | 27 | 29 | 32 | 35 | 40 | 48  |
| 26 | 27 | 29 | 32 | 35 | 40 | 48 | 58  |
| 26 | 27 | 29 | 34 | 38 | 46 | 56 | 69  |
| 27 | 29 | 35 | 38 | 46 | 56 | 69 | 83. |

10. The method of claim 7, wherein:

the plurality of quantization levels comprises quantization levels distributed logarithmically; and each quantization level of the plurality of quantization levels corresponds to a quantization table produced by scaling each entry of a basic quantization table by the quantization level.

11. The method of claim 1, wherein the block of signals is a subblock of a macroblock comprising a plurality of subblocks.

12. The method of claim 11, wherein:

the macroblock comprises four subblocks of luminance signals and two subblocks of chrominance signals;

all subblocks of the macroblock are quantized during encoding at the same quantization level; and the initial quantization level can be modified only when the at least one adjacent block of pixels corresponds to a second macroblock different from the first macroblock.

13. The method of claim 1, wherein the at least one adjacent block of pixels comprises every adjacent block of pixels that has already been encoded.

14. The method of claim 1, comprising the further steps of:

(c) determining whether a real edge exists before encoding between the block of pixels and the at least one adjacent block of pixels; and (d) letting the initial quantization level and other parameters of the plurality of encoding parameters remain unchanged before encoding the block of signals if the real edge exists.

15. An apparatus for encoding video signals, wherein the encoding is defined by a plurality of encoding parameters, the apparatus comprising:

(a) means for determining an initial quantization level for quantizing a block of signals representative of a block of pixels of a picture, wherein the initial quantization level is an encoding parameter of the plurality of encoding parameters; and (b) means for modifying at least one encoding parameter of the plurality of encoding parameters before encoding the block of signals to provide a modified plurality of encoding parameters such that block edge artifacts between the block of pixels and at least one adjacent block of pixels that arise after decoding encoded signals are reduced.

16. The apparatus of claim 15, wherein:

the initial quantization level corresponds to an initial quantization table having a plurality of predetermined entries;

quantizing the block of signals with a given quantization level produces a block of index signals;

signals of the block of signals, index signals of the block of index signals, and entries of the initial quantization table are encoding parameters of the plurality of encoding parameters; and means (b) comprises means for modifying at least one of:
the initial quantization level,
a signal of the block of signals,
an index signal of the block of index signals, and
an entry of the initial quantization table.

17. The apparatus of claim 16, wherein:

encoding the block of signals with the plurality of encoding parameters corresponds to a first encoding error and encoding the block of signals with the modified plurality of encoding parameters corresponds to a second encoding error; and means (b) comprises means for modifying at least one of:
the initial quantization level,
a signal of the block of signals,
an index signal of the block of index signals, and
an entry of the initial quantization table
before encoding the block of signals to provide a modified plurality of encoding parameters, such that block edge artifacts between the block of pixels and at least one adjacent block of pixels that arise after decoding encoded signals are reduced and further such that any increase in error from the first encoding error to the second encoding error is below a predetermined threshold.

18. The apparatus of claim 15, wherein:

encoding the block of signals with the plurality of encoding parameters corresponds to a first encoding error and encoding the block of signals with the modified plurality of encoding parameters corresponds to a second encoding error; and means (b) comprises means for modifying at least one encoding parameter of the plurality of encoding parameters before encoding the block of signals to provide a modified plurality of encoding parameters, such that block edge artifacts between the block of pixels and at least one adjacent block of pixels that arise after decoding encoded signals are reduced and further such that any increase in error from the first encoding error to the second encoding error is below a predetermined threshold.

19. The apparatus of claim 15, wherein the block of signals is a block of coefficient signals produced by transforming the block of pixels.

20. The apparatus of claim 19, wherein the block of coefficient signals is a block of discrete cosine transform (DCT) coefficient signals produced by performing a DCT on the block of pixels.

21. The apparatus of claim 15, wherein the initial quantization level is selected from a plurality of quantization levels.

22. The apparatus of claim 21, wherein:

the plurality of quantization levels comprises quantization level 1 to quantization level 31; and each quantization level of the plurality of quantization levels corresponds to a quantization table produced by scaling each entry of a basic quantization table by the quantization level.

23. The apparatus of claim 22, wherein the basic quantization table comprises the following array of predetermined entries:

| 8  | 16 | 19 | 22 | 26 | 27 | 29 | 34  |
|----|----|----|----|----|----|----|-----|
| 16 | 16 | 22 | 24 | 27 | 29 | 34 | 37  |
| 19 | 22 | 26 | 27 | 29 | 34 | 34 | 38  |
| 22 | 22 | 26 | 27 | 29 | 34 | 37 | 40  |
| 22 | 26 | 27 | 29 | 32 | 35 | 40 | 48  |
| 26 | 27 | 29 | 32 | 35 | 40 | 48 | 58  |
| 26 | 27 | 29 | 34 | 38 | 46 | 56 | 69  |
| 27 | 29 | 35 | 38 | 46 | 56 | 69 | 83. |

24. The apparatus of claim 21, wherein:

the plurality of quantization levels comprises quantization levels distributed logarithmically; and each quantization level of the plurality of quantization levels corresponds to a quantization table produced by scaling each entry of a basic quantization table by the quantization level.

25. The apparatus of claim 15, wherein the block of signals is a subblock of a macroblock comprising a plurality of subblocks.

26. The apparatus of claim 25, wherein:

the macroblock comprises four subblocks of luminance signals and two subblocks of chrominance signals;

all subblocks of the macroblock are quantized during encoding at the same quantization level; and the initial quantization level can be modified only when the at least one adjacent block of pixels corresponds to a second macroblock different from the first macroblock.

27. The apparatus of claim 15, wherein the at least one adjacent block of pixels comprises every adjacent block of pixels that has already been encoded.

28. The apparatus of claim 15, further comprising:

(c) means for determining whether a real edge exists before encoding between the block of pixels and the at least one adjacent block of pixels; and (d) means for letting the initial quantization level and other parameters of the plurality of encoding parameters remain unchanged before encoding the block of signals if the real edge exists.

29. The apparatus of claim 15, wherein the apparatus is a microprocessor and the microprocessor is electrically connected to a memory device via a data bus.

30. A computer-implemented method for encoding a block of signals representative of a block of pixels of a picture, wherein the encoding is defined by a plurality of encoding parameters including a quantization level selected from a plurality of possible quantization levels, the method comprising the steps of:

(a) determining an encoding error for the block of pixels such that the encoding error for the block of pixels tends to be larger for encoding parameters that cause a block edge artifact between the block of pixels and at least one adjacent block of pixels; and (b) selecting a plurality of encoding parameters in accordance with the encoding error determined in step (a).

31. The method of claim 30, wherein:

step (a) comprises the steps of:
(1) determining encoding errors for adjacent edge pixels of the at least one adjacent block of pixels; and
(2) determining the encoding error for the block of pixels such that the encoding error for the block of pixels tends to be larger when encoding errors of pixels of the block of pixels that are adjacent to the adjacent edge pixels are different than encoding errors for adjacent edge pixels, respectively; and step (b) comprises the step of selecting the plurality of encoding parameters of a plurality of possible pluralities of encoding parameters to minimize the encoding error for the block of pixels.

32. An apparatus for encoding a block of signals representative of a block of pixels of a picture, wherein the encoding is defined by a plurality of encoding parameters including a quantization level selected from a plurality of possible quantization levels, the apparatus comprising:

(a) means for determining an encoding error for the block of pixels such that the encoding error for the block of pixels tends to be larger for encoding parameters that cause a block edge artifact between the block of pixels and at least one adjacent block of pixels; and (b) means for selecting a plurality of encoding parameters in accordance with the encoding error determined by means (a).

33. The apparatus of claim 32, wherein:

means (a) comprises:
(1) means for determining encoding errors for adjacent edge pixels of the at least one adjacent block of pixels; and
(2) means for determining the encoding error for the block of pixels such that the encoding error for the block of pixels tends to be larger when encoding errors of pixels of the block of pixels that are adjacent to the adjacent edge pixels are different than encoding errors for adjacent edge pixels, respectively; and means (b) comprises means for selecting the plurality of encoding parameters of a plurality of possible pluralities of encoding parameters to minimize the encoding error for the block of pixels.

34. The apparatus of claim 33, wherein the apparatus is a microprocessor and the microprocessor is electrically connected to a memory device via a data bus.

* * * * *